Patented Sept. 27, 1949

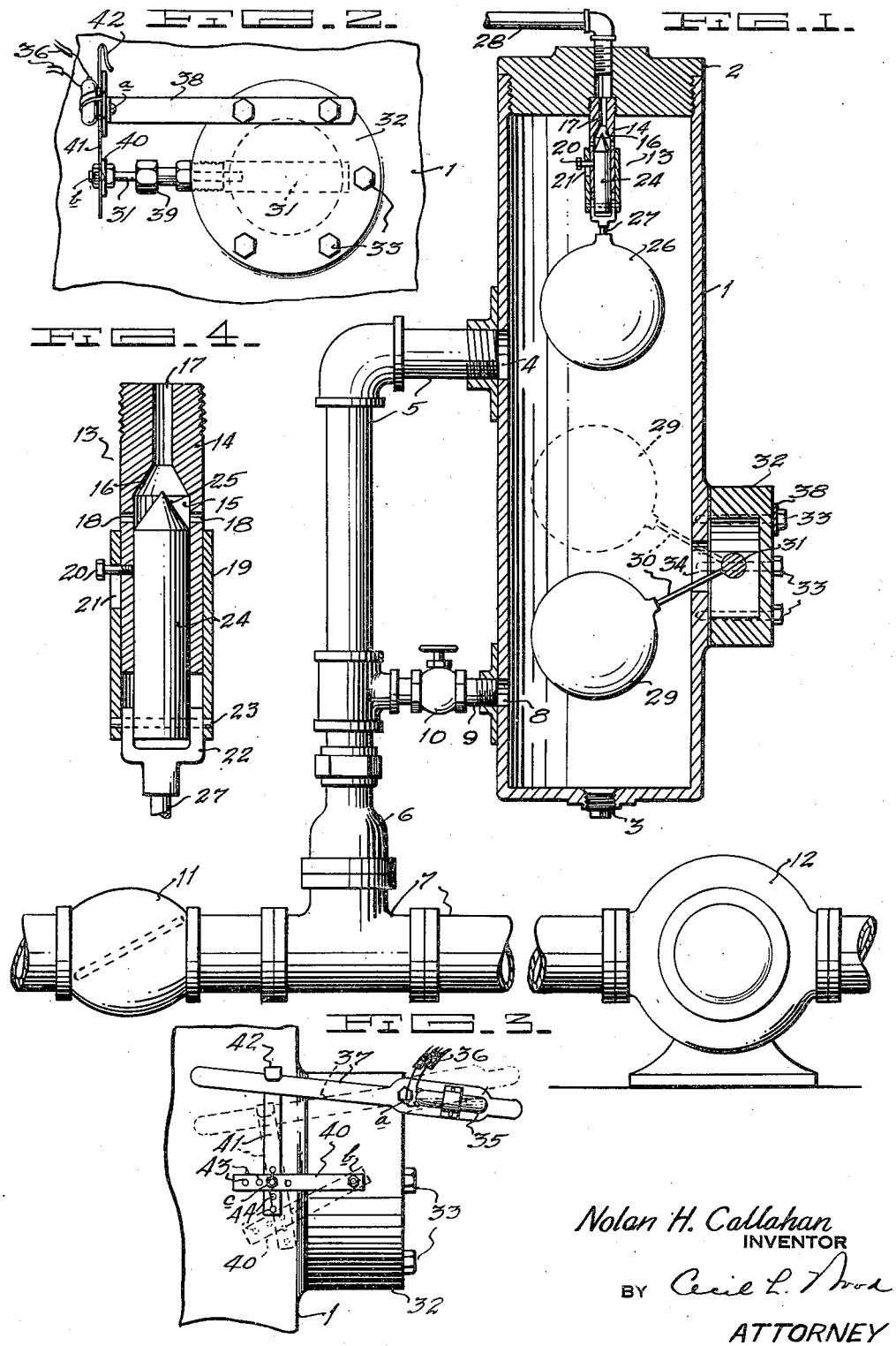

2,483,084

UNITED STATES PATENT OFFICE 2,483,084

PUMP CONTROL DEVICE

Nolan H. Callahan, Alice, Tex.

Application November 5, 1945, Serial No. 626,705

4 Claims. (Cl. 103—26)

1

This invention relates to an automatic air release for pipe lines through which oil is conveyed, and it has particular reference to apparatus for discharging of air from pipe lines used in gathering systems where oil is delivered from storage tanks to the main pipe line and its principal object resides in the provision of apparatus adapted to be installed in the line on the discharge side of the pump employed for pumping the oil through the line and thus prevent the occurrence of gas or air "pockets" between the pump and the conventional check valve from which it tends to impair the operation of the pump and materially hinder the movement of the oil through the line.

Another object of the invention resides in the provision of apparatus capable of stopping the pump when oil ceases to flow through the line from the source thus automatically preventing the destruction of the said pump and its driving unit, as well as preventing the loss of power in the operation of the pump after the source of supply is exhausted.

Yet another object of the invention is manifest in the provision of apparatus capable of automatic operation in the handling of oil products through a pipe line without the usual attentions ordinarily required in manually stopping the pump when the source of supply is exhausted or by the use of time clocks conventionally employed for such purpose after the "run" is completed and enabling the attendant to simply set the pump at the beginning of the run and be assured of the automatic shutting off of the pump when the source is exhausted by a system of floats connected with a switch through which the driving element of the pump is actuated.

Still another object of the invention resides in the provision of an automatic air release mechanism embodying elements designed to permit the discharge of air from the line until said line is completely devoid of air pockets and automatically close the air outlet by oil flowing into the apparatus from the said line. Another object of the invention is manifest in the provision of a means whereby the automatic shutting off of the driving element of the pump is delayed until after the oil in the line is pumped past the check valve and the pump is entirely empty thus preventing the pump from continuing to operate without lubrication.

Broadly, the invention seeks to comprehend the provision of an automatic air release from pipe lines embodying float control mechanisms whereby air is permitted to be discharged from the line in advance of the flow of oil passing therethrough

2 and to automatically prevent the operation of the pump when all of the oil is discharged therefrom resulting in great saving of time, labor and machinery.

While the foregoing objects are paramount, other and lesser objects will become manifest as the description proceeds taken in connection with the appended drawings wherein:

Figure 1 is a vertical cross-sectional illustration of the invention shown connected in a pipe line between the pump and the check valve.

Figure 2 is a fragmentary elevational view of the switch actuating mechanism attached to the exterior of the main housing.

Figure 3 is a fragmentary side elevational view of the automatic switch operating mechanism illustrating in Figure 2, and Figure 4 is a vertical cross-sectional view of the air discharge valve arranged in the uppermost end of the housing, as shown in Figure 1.

Gathering systems are so called because such pipe lines are usually employed on leases from which oil is gathered and delivered to the main pipe line as a common carrier. In the operation of gathering systems any number of tanks or reservoirs in which oil is stored may be connected into the system and one or more pumps used to "boost" the oil through the line to the main pipe line. Ordinarily a check valve is provided on the discharge side of the pump to prevent oil from flowing back through the pump when the latter is at rest. Air "pockets" ordinarily form between the pump and the check valve which prevents the proper operation of the pump due to the fact that oil cannot flow through the line against the air accumulated therein and which is ordinarily drawn thereinto from a tank when the last of the oil is discharged therefrom.

The primary object of the invention, therefore, is to release such air pressures from the line to permit the flow of oil and enable the pump to function. The invention is designed to operate on the discharge side of the pump and to be installed between the pump and the check valve in a manner which will be hereinafter described.

Accordingly, therefore, the invention consists primarily of a housing I preferably cylindrical in form and closed at its upper end by a plug 2 threaded thereinto, as shown in Figure 1. A drain outlet is provided in the bottom of the housing I and closed by a plug 3 for the purpose of draining sediment and waste materials therefrom. The housing I is provided with an air and oil inlet opening 4 toward the upper end thereof and which is connected with a pipe 5 and a reducing nipple 6 with the pipe line 7. Near the bottom of the housing 1 is provided an oil outlet opening 8 which communicates with the pipe 5 through a conduit 9 and a valve 10.

It will be noted that a check valve 11, of the conventional type, is installed in the pipe line 7 on the discharge side of the pump 12 and the communication 5 between the housing 1 and the pipe 7 is located at some point between the check valve 11 and the pump 12, as illustrated in Figure 1.

As the source of supply of oil is exhausted the product is pumped through the line 7 past the check valve 11 and is pumped into the line 7 from the source such as a storage tank (not shown) and will, of course, prevent the passing of oil through the line until the air is discharged therefrom. Such air will escape upwardly through the line 5 and into the housing 1 thence out through the top of the latter in which a valve assembly 13 is arranged, as shown in Figure 1. The valve assembly 13 consists of a cylindrical member 14 having a bore 15 in the lower portion thereof which is provided with a conical seat 16 in its upper end communicating with a smaller bore 17 in the upper end of the member 14, as shown in Figure 4. Just below the seat 16 are arranged a plurality of ports 18 which are adapted to be covered by a sleeve 19 slidably arranged upon the member 14 and retained thereon by a screw 20 extending through a slot 21 in the wall of the member 19.

A yoke member 22 is secured to the lower end of the sleeve 19 of a pin 23 which also passes through the lowermost end of a closure 24 slidably disposed within the bore 15 of the member 14 and which is provided with a conical upper end 25 adapted to engage the seat 16. The closure member 24 is also adapted to slide upwardly within the member 14 and cover the ports 18, previously described. By reason of the rigid connection, therefore, between the sleeve 19, the yoke 22 and the closure 24, all of these elements must move together.

A float 26, shown in Figure 1, is secured through a connecting link 27 to the yoke 22 and is adapted to raise the elements 19 and 24 to close the ports 18 and prevent the passage of air therethrough as oil flows into the housing 1 and reaches a suitable level therein to actuate the float 26. Normally, however, the valve assembly 13 remains open and permits air passing into the housing 1 through the conduit 5 to escape through the top 2 of the device and out through the pipe 28 to the atmosphere and is shut off only after the oil level in the housing 1 reaches the sufficient height to actuate the float 26.

After the air is discharged from the line 7 between the check valve 11 and the pump 12 oil is permitted to flow freely through the line 7 and will, of course, pass upwardly through the conduit 5 into the housing 1 through the oil and air inlet 4. This is also true of the conduit 9 and the oil outlet 8. When the housing 1 is filled with oil the lowermost float 29 is raised to the position illustrated in dotted lines in Figure 1. This float is connected through a rigid coupling 30 to a rotating pin 31 extending transversely through a circular housing 32 secured by bolts 33 to one side of the housing 1, as illustrated in Figure 1. The coupling 30 between the float 29 and its pivotal mounting 31 is adapted to operate through a slot 34 in the wall of the housing 1 affording a communication between the interior of the latter and the housing 32.

The function of the float 29 is to actuate a switch, such as a mercuroid tube 35, illustrated in Figure 3, connected into the ignition system of a gasoline motor or the electric circuit of an electric motor (not shown) and by which the flow of current is broken or completed through the wires 36 fragmentarily illustrated in Figure 3. The switch 35 is secured to an arm 37 pivotally supported at $a$ to a rigid arm 38 secured to the face of the housing 32 by certain of the bolts 33 by which the housing 32 is secured to the main housing 1, as shown in Figure 2.

The supporting pin 31, to which the float 29 is attached through the coupling 30, extends through one side of the circular housing 32, as shown in Figure 2, projecting through a stuffing box 39. An arm 40 is rigidly connected at $b$ to the end of the pin 31 and extends substantially parallel to the arm 37 supporting the switch 35 previously described. Toward the opposite end of the arm 40 is adjustably secured a vertical lever 41 which is provided with a hook 42 at its uppermost end adapted to overreach and engage the end of the arm 37 opposite the switch 35 in a manner illustrated in Figure 3.

When the driving element for the pump 12, such as an internal combustion engine or electric motor, is manually started, the arm 37 is arranged in its uppermost position, as shown in Figure 3, while the arm 40, by reason of its connection through the pin 31 to the float 29 will assume a position as shown in dotted lines in Figure 3. As oil flows into the housing 1 through either of the conduits 5 and 9 the float 29 will rise, rotating the pin 31 and raising the arm 40 and the vertical lever 41 so that the hook 42 at the upper end of the member 41 will be above the arm 37. As oil flows out of the housing 1 back into the line 7 through the conduit 9, being controlled through the valve 10, the float 29 will be lowered to the position shown in Figure 1 causing the arm 40 and the lever 41 to move downwardly and thus cause the hook 42 to engage the lever 37, moving the latter downwardly and tilting the switch 35 so that the mercury therein will close the circuit through the wires 36 and short out the motor, if the latter is an internal combustion engine. If an electric motor is employed, and it is desired to break the circuit through the wires 36, a reverse operation of the switch 35 will be desired.

It will be noted that the operation of the pump 12 can be controlled, insofar as stopping the same is concerned, by regulating the valve 10 so that oil is allowed to pass out of the housing 1 as slowly as desired causing the float 29 to be lowered at the required speed. The shutting off of the pump, therefore, is delayed in accordance with the requirements and without injury to the machinery which would result by permitting the same to run indefinitely after the supply of oil has been diminished.

The switch actuating assembly, consisting of the arms 37 and 40, together with the vertical lever 41, is adjustable to insure the proper function of the assembly. Figure 3 illustrates the horizontal arm 40 as having a series of spaced perforations 43 which correspond to a vertical arrangement of spaced perforations 44 in the vertical lever 41. These members are adjustable with respect to each other by changing the rigid connection $c$ which retains these two parts in their operative relationship. This adjustment may be employed when it is desirable to change the coordination between the float 29 and the mercuroid tube 35 previously described.

Although the invention has been described with great particularity, it is not intended that the same be limited to the structure herein shown and described but that any changes and modifications which may be resorted to and which may be considered as falling within the spirit of the invention, may also be considered as falling within the scope of the appended claims.

What is claimed is:

1. In an automatic air release for pipe lines, the combination with a pump and switch therefor and an air and oil receptacle having inlet and outlet communications with the said pipe line on the discharge side of the said pump, in combination, a normally open float actuated air outlet valve in the top of the said receptacle adapted to be closed by oil entering the said receptacle through the said communications, and a float actuated switch adapted to stop the said pump as the oil is discharged through the outlet communication into the said pipe line.

2. In an automatic air release for oil pipe lines having a motor driven pump installed therein, in combination, an air and oil receptacle having inlet and outlet communications with the said pipe line, a float actuated air outlet valve in the top of the said receptacle adapted to be closed by oil entering the receptacle through both of the said communications, and a float actuated switch associated with the said receptacle adapted to be operated to stop the said pump as oil is discharged from the said receptacle through the said outlet communication.

3. In an automatic air release for oil pipe lines having a motor driven pump therefor, in combination, an air and oil receptacle having inlet and outlet communications connected into the said pipe line on the discharge side of the said pump, a normally open float operated air discharge valve in the top of the said receptacle and amenable to the action of the said oil entering the said receptacle through the said communications, and a float actuated switch adapted to stop the said pump when oil is drained into the said pipe line from said receptacle through the said outlet communication.

4. In an automatic air release for pipe lines having a motor driven pump installed therein and an air and oil receptacle having inlet and outlet conduits communicating with the said pipe line on the discharge side of the said pump, in combination, an air discharge valve in the top of the said receptacle having an actuating float attached thereto and adapted to be closed when air is expelled from said receptacle by oil entering the same from the said pipe line, a float actuated switch for the said pump associated with the said receptacle, and a float operating within the said receptacle adapted to operate the said switch to stop the said pump as the oil is discharged from the said receptacle.

NOLAN H. CALLAHAN.

REFERENCES CITED

The following references are of record in the file of this patent:

UNITED STATES PATENTS

| Number | Name | Date |
| --- | --- | --- |
| 1,690,254 | Skidmore | Nov. 6, 1928 |